Patented June 27, 1950

2,512,628

UNITED STATES PATENT OFFICE 2,512,628

PROCESS OF TREATING POLYTRIAZOLES

James Wotherspoon Fisher, Edward William Wheatley, and Harold Bates, Spondon, near Derby, England, assignors to Celanese Corporation of America, a corporation of Delaware No Drawing. Application November 5, 1947, Serial No. 784,306. In Great Britain May 10, 1945

9 Claims. (Cl. 260—67.5)

This invention relates to improvements in polymeric materials and in processes for their production.

This application is a continuation-in-part of U. S. application S. No. 662,628, filed April 16, 1946.

U. S. application S. No. 609,031 filed August 4, 1945 describes the production of linear nitrogen-containing polymers from dihydrazides of dicarboxylic acids in presence of hydrazine, e. g. 10% by weight of the dihydrazide, over and above that combined in the dihydrazide and also describes using dicarboxylic esters with an amount of hydrazine in excess of two moles for each mole of dicarboxylic ester. U. S. application S. No. 662,628 filed April 16, 1946 describes the production of such polymers from hydrazine and the dicarboxylic acids themselves or their anhydrides, again using more than two moles of hydrazine. Further U. S. application S. No. 662,628 describes the production of nitrogen-containing polymers from mixtures of diamides and dihydrazides of dicarboxylic acids with free hydrazine, from dicarboxylic acids, esters or anhydrides with ammonia and hydrazine using more than two moles of total base including more than one mole of hydrazine, from dinitriles of dicarboxylic acids with hydrazine, and from various other combinations of raw materials. Polymers may be produced according to the processes of the specifications which possess characteristics, including resistance to degenerative hydrolysis by boiling hydrochloric acid, indicating that they contain the 1.2.4-triazole nucleus repeated along the main polymer chain and linked to the polymer chain at the 3 and 5 positions. These polymers, which are resistant to hydrolysis by hydrochloric acid, will be referred to in the present specification as poly-1.2.4-triazoles.

As stated in the said specifications, the polymeric materials may be of sufficiently high molecular weight to render them capable of being formed into films, filaments or other articles, for example by melt spinning or by wet or dry spinning processes. Polymers particularly suitable for this purpose are those of high melting point and high nitrogen content approximating to the theoretical nitrogen content for a polymer containing the 4-amino-1.2.4-triazole nucleus repeated at intervals along the polymer chain and linked together by the links derived from the dicarboxylic acid or derivative used as starting material. These polymers of high melting point and high nitrogen content which are resistant to hydrolysis by hydrochloric acid will be referred to as poly-4-amino-1.2.4-triazoles and are a species of the poly-1.2.4-triazoles referred to in the preceding paragraph.

According to the present invention, the above polymers are aftertreated with acylating agents or with aldehydes or ketones for the purpose of modifying their properties, for example increasing their melting points or decreasing their moisture regain or even rendering them completely insoluble in organic solvents and infusible.

The acylating agents for use according to the present invention include unsubstituted and substituted, saturated and unsaturated, mono- and poly-carboxylic acids and their acylating derivatives, for example the corresponding anhydrides, esters, acid halides, for example chlorides, and amides. In the case of the esters or the amides, the residue joined to the acid carbonyl group should be the residue of a volatile alcohol or phenol or amine (including ammonia). Formic acid, acetic acid, caproic acid, heptoic acid, lactic acid, levulinic acid and benzoic acid are the most important of the monocarboxylic acids which may be used in the free state or as an acylating derivative. Examples of di- or poly-carboxylic acids include carbonic acid (used in the form of an organic carbonate, phosgene, a urethane or urea), oxalic acid (preferably used as the ethyl ester), succinic acid, maleic acid, adipic acid, sebacic acid, phthalic acid, carballylic acid and citric acid. The invention is not, however, confined to the use of carboxylic acids or their acylating derivatives as the acylating agents but includes the use of di- or poly-basic inorganic acids, for example boric acid, thioacylating agents corresponding with the carboxylic acids and such derivatives as imino ethers, isocyanates and urethanes, isocyanic acid and isothiocyanic acid (preferably applied in the form of their alkali salts to a hydrochloride of the polymer), and cyanamide, which converts the amino group into a guanidine group, and alkyl, aryl and aralkyl cyanamides. By employing an acylating agent which contains two or more acylating groups, the polymer may be rendered infusible and insoluble in organic solvents. Such agents include the di- and poly-carboxylic acids and the di- and poly-isocyanates and isothiocyanates.

With regard to the carbonyl treating agents, namely the aldehydes and ketones, the ketones are relatively slow to react and accordingly it is preferred to use aldehydes. Formaldehyde is the most important reagent in this group and it is found that it fairly readily leads to cross-linking of the polymer, that is to say to infusibility and insolubility. Other aldehydes, at least in the early stages of the reaction, tend to change the solubility characteristics rather than to render the polymers insoluble. Acetaldehyde, benzaldehyde and furfural may be instanced as examples of these other aldehydes. Reagents may be used which contain two or more carbonyl groups, for example dialdehydes or aldehydoketones.

It will be appreciated that both with the acylating agents and with the carbonyl compounds reaction may take place with a small proportion or a large proportion of the nitrogen atoms disposed along the polymer chain. The polymers so treated thus contain both modified and unmodified structural units.

Insolubilising treatments are preferably applied to the polymers after they have been shaped to the desired form, for example formed into filaments, fibres, bristles and films. These one- and two-dimensional materials will be referred to in the claims as gracile materials to differentiate them from three-dimensional products such as rods, tubes and moulded articles.

The treatment with the acylating agents, aldehydes or ketones, may be applied directly with the undiluted treating agent, if it is liquid or can be applied in the vapour state, or the treating agent may be diluted with a suitable solvent. Since many of the acids and aldehydes are solvents for the polymers, dilution with a suitable solvent of the treating agent is particularly applicable in the case of treating already formed filaments, fibres, bristles, films and the like.

Some of the reagents, notably formaldehyde and acetaldehyde, react in the cold so that mere standing in contact with the treating agent is sufficient. Other agents, notably the free carboxylic acids, require heat to effect the desired acylation. In the case of formic acid, for example, reaction at water bath temperatures is very suitable. Isocyanates may be applied in boiling benzene or other suitable solvent. Another method, applicable to the case where heat or an extended reaction time is required to effect the desired modification of the properties of the polymer, consists in impregnating the polymer with the desired reagent and subsequently heating or allowing to stand. Insolubilising treatments with this type of treating agent may be carried out by forming a filament, film or the like from a mixture of the polymer and the treating agent under such conditions that no reaction occurs and subsequently heating the filament, film or the like so as to bring about the desired reaction.

The following examples illustrate the invention.

Example 1

A yarn was formed from a melt of 20 parts of orthophenyl phenol and 80 parts by weight of a polyaminotriazole made by heating sebacic dihydrazide with hydrazine hydrate as described in U. S. application S. No. 609,031. The yarn was wound into hanks without cold-drawing. A hank of the yarn was immersed in cold 40% aqueous formaldehyde for 2 hours. The yarn had retained its strength (the breaking load increased somewhat) and the filaments had acquired a pronounced rubbery nature with considerable elasticity. When the yarn was placed on a plate electrically heated ao approximately 400° C., the yarn did not fuse and could still be readily separated into filaments. A sample of the untreated yarn melted immediately when deposited on the hot plate. In addition the treated yarn was substantially more resistant to boiling water than the untreated yarn.

Hanks of the same yarn were treated in the cold with 40% aqueous formaldehyde for periods ranging from 2 minutes to 20 minutes. In all cases there was some increase in the breaking load and an increase in the resistance of the yarn to boiling water.

Example 2

A hank of the yarn treated according to Example 1 was immersed in 40% aqueous formaldehyde in the cold for 8 minutes, washed with cold water and then extracted with boiling acetone for 2 minutes for the purpose of removing the plasticiser. The hank was then treated in boiling water for 10 minutes. The treated yarn possessed a good lustre and a pleasant handle. Again the breaking load had increased and, as indicated by the treatment with boiling water, the product was very resistant to the action of water.

The same hanks were extracted with acetone prior to the formaldehyde and hot water treatment. The formaldehyde and hot water treatments were then carried out as described in the preceding paragraph. Still higher tenacity figures were obtained in the resulting yarn.

Example 3

A polyaminotriazole prepared from sebacic dihydrazide and hydrazine hydrate as described in U. S. application S. No. 609,031 was allowed to stand with three times its own weight of acetaldehyde at room temperature for 24 hours. At the end of this period most of the polymer had dissolved to form a clear viscous liquid. This was poured into excess water when a plastic white solid was precipitated which was washed with water and carefully dried. Whereas the original polymer was insoluble in methanol and readily soluble in meta-cresol and in acetic acid and formic acid, the treated polymer was partly soluble in methanol and only partly soluble (gelled) in meta-cresol. It was soluble in acetic acid and formic acid.

Example 4

The same polymer was heated with its own weight of benzaldehyde under nitrogen for 3 hours at 160° C. Most of the polymer had dissolved within the first hour but the further two hours were necessary to complete solution. The final product was a clear pale yellow viscous syrup. The syrup was poured into petrol ether and on stirring a white plastic mass deposited. This was redissolved in a minimum of hot methanol and the solution poured into excess water. The resulting plastic white solid was dried. The product was soluble in methanol, cresol, acetic acid and formic acid, whereas the original polymer was insoluble in methanol and soluble in cresol, acetic acid and formic acid.

Example 5

A hank of the yarn used in Example 1 was treated with boiling acetone for 10 minutes for the purpose of extracting the plasticiser and the hank was then dried. The dried hank was refluxed in a mixture containing 95 parts by volume of ethyl benzene and 5 parts by volume of acetic anhydride for 10 minutes and was washed with acetone and finally dried. The acetyl content expressed as acetic acid was found to be about 10%. The yarn was very much more resistant to the action of boiling water than before treatment, and also more resistant to the solvent action of methanol. The yarn when heated to 200° C. did not melt.

Example 6

Yarn produced by the melt spinning of a polyaminotriazole, obtained according to U. S. application S. No. 609,031 by the polymerisation of sebacic dihydrazide in presence of hydrazine hydrate, was dissolved in 85% aqueous formic acid and the solution maintained at 100–110° C. for 3 hours. The resultant viscous solution was poured into water with rapid stirring. The precipitated polymer was thoroughly washed with cold water and proved to be fairly soluble in methanol (the original polymer is insoluble in methanol) and readily soluble in methanol/chloroform mixtures. The combined formic acid content was 7.1%. Samples of the formylated polyaminotriazole were dissolved in a mixture of equal parts by volume of chloroform and methanol to a concentration of 20%, and the resulting dope was flowed on to glass plates and the solvent allowed to evaporate at room temperature. At this stage the films were opaque. They were transferred to an oven where they were dried at 100–110° C. The film was then clear and tough and possessed somewhat elastic properties.

Example 7

A solution of the same polyaminotriazole in 85% formic acid was refluxed for 3 hours and then poured into excess water. The precipitated polymer was washed repeatedly to remove as much free acid as possible and then dissolved in methanol. The alcoholic solution was then poured into acetone. The methanol treatment was repeated. One portion of the precipitated material was dried in air and showed a final content of combined formic acid of about 8%, was soluble in methanol and methanol/chloroform mixtures and insoluble in water and acetone. Another portion was oven-dried at 110° C. This showed a content of combined formic acid of 12.5% and had similar solubility properties.

Refluxing with formic acid for only 1 hour, followed by the same treatment as described above and oven-drying gave a product soluble in methanol and methanol/chloroform mixtures and with a combined formic acid content of 8%. It yielded strong films from alcoholic solvents.

Example 8

An acetic acid solution of the same polyaminotriazole was refluxed for 3 hours and poured into excess water. The precipitated plastic mass was thoroughly washed with water, dissolved in methanol and the solution poured into water. The polymer was then divided into two portions, one of which was air-dried and the other oven-dried at 110° C. Both were soluble in methanol and methanol/chloroform mixtures and gave good strong flexible films from the methanol dopes. The air-dried material had a combined acetic acid content of 8.2% and the oven-dried material of 9.2%.

Refluxing for only 1 hour with the acetic acid gave, after air-drying, a combined acetic acid content of 2.4% and, after oven-drying, a combined acetic acid content of 3.9%. Both products were slightly soluble in methanol and moderately soluble in methanol/chloroform. They were insoluble in water and acetone.

Example 9

The same polyaminotriazole was dissolved in twice its weight of a mixture of equal parts by volume of acetic acid and acetic anhydride and the resulting solution was refluxed for 3 hours and poured into excess water. The product was repeatedly dissolved in methanol and reprecipitated in water. One portion of the product was then air-dried, which showed a combined acetic acid content of 22.8%, and the remaining portion was oven-dried at 110° C. and showed a combined acetic acid content of 23.2%. Both products were insoluble in water and acetone and readily soluble in methanol and methanol/chloroform mixtures.

Example 10

The same polyaminotriazole was refluxed with twice its weight of acetic anhydride for 1 hour. After the first half hour a clear viscous solution was produced. After the full 1-hour treatment the dope was cooled and poured into excess water. The sticky white plastic mass, still containing acetic anhydride and acetic acid, was dissolved in hot acetone and the acetone solution poured into water to reprecipitate the polymer, which was well rinsed with very dilute ammonium hydroxide followed by repeated washing with cold water. The resulting tough solid having a melting point of 210–220° C. was insoluble in water, chloroform and benzene, greatly swollen by methanol, soluble in ethylene glycol, meta-cresol, acetic acid and formic acid, and had a combined acetic acid content of 18%. It readily formed fibres and films from the melt.

Example 11

Example 8 was repeated using heptoic acid instead of acetic acid and a film of the heptoylated polyaminotriazole was clear, tough and of a soft rubbery texture.

Example 12

A waste yarn made from the same polyaminotriazole was dissolved in warm 60% lactic acid to give a clear viscous solution which was then maintained at 100–110° C. for 2 hours. The acid solution was spread directly on to glass plates, followed by careful drying in the oven. The films produced were clear, tough and somewhat elastic. They showed an affinity for Sky Blue IV, which is a direct cotton colour.

Example 13

The same polyaminotriazole was heated under nitrogen with its own weight of benzoic anhydride for ½ hour at 180–190° C. The polymer dissolved fairly readily to give a thick dope which on cooling formed a tough glassy mass capable of yielding long lustrous filaments. The product was dissolved in cold 85% formic acid and the solution poured into excess of dilute alkali. The precipitated polymer was thoroughly washed with cold water and dried. It readily yielded long filaments from the melt, was slightly soluble in methanol, soluble in meta-cresol, acetic acid and formic acid, and insoluble in water, acetone, chloroform and benzene. It appeared probable that the product still contained free benzoic anhydride, and a sample was further extracted with hot water for 5 hours and then dried. The melting point of this final product was 200° C.

Example 14

The same polyaminotriazole was refluxed for 2 hours with twice its own weight of a mixture of equal parts of acetic acid and adipic acid. A thick dope was obtained which was poured into water and extracted repeatedly with hot water. The product showed a combined acetic acid content of 4.7% and a combined adipic acid content of 7.6%. Films were cast from this product from a solution in methanol/chloroform. The films were then heated for several hours at 110° C. but showed no tendency to cross-linking. The temperature was then raised to 150° C. for 2 hours, when the product became difficultly fusible and insoluble in methanol/chloroform mixtures, showing that cross-linking had occurred.

*Example 15*

A formylated polyaminotriazole obtained according to the first paragraph of Example 7 was dissolved in a mixture of equal parts by volume of methanol and chloroform to form a 30% solution, and to this solution was added an amount of sebacic acid equal to 1.5% by weight of the formylated polymer. The solution was then spread on glass and the excess solvent allowed to evaporate at room temperature. An opaque layer formed which cleared completely and permanently when heated in an oven at 110° C. After this treatment there was very little sign of cross-linking. The temperature was then raised to 150° C., when the film gradually became difficultly fusible and insoluble in boiling methanol/chloroform.

*Example 16*

A hank of dry polyaminotriazole yarn melt spun from a polymer obtained by heating sebacic dihydrazide with hydrazine hydrate as described in U. S. application S. No. 609,031 was impregnated with 20% of its own weight of hexamethylene di-isocyanate in the form of a 10% solution in dry benzene. The benzene was then removed in a stream of dry air at 70° C. and the hank baked at 120° C. for 2 hours, rinsed with benzene and scoured in a 0.25% soap solution at 70° C. The resulting product was substantially infusible and insoluble in methanol and other solvents.

Having described our invention, what we desire to secure by Letters Patent is:

1. Process for the further treatment of a linear poly-4-amino-1.2.4-triazole linked in the polymer chain at the 3.5 positions, which comprises reacting the linear polymer with a substance selected from the group consisting of acylating agents and aldehydes.

2. Process for the further treatment of a linear poly-4-amino-1.2.4-triazole, which comprises reacting the polymer with formaldehyde.

3. Process for the further treatment of gracile materials containing a linear poly-4-amino-1.2.4-triazole, which comprises treating the material with formaldehyde and continuing the treatment until the polymer is substantially infusible.

4. Process for the further treatment of a linear poly-4-amino-1.2.4-triazole, which comprises reacting the polymer with a monocarboxylic acid acylating agent.

5. Process according to claim 4, wherein the treating agent is hot formic acid.

6. Process for the further treatment of gracile materials containing a linear poly-4-amino-1.2.4-triazole, which comprises reacting the material with a polyfunctional acylating agent and continuing the treatment until the polymer is substantially infusible.

7. Process for the further treatment of gracile materials containing a linear poly-4-amino-1.2.4-triazole, which comprises reacting the material with a polycarboxylic acid acylating agent and continuing the treatment until the polymer is substantially infusible.

8. An acylated poly-4-amino-1.2.4-triazole.

9. Process according to claim 4, wherein the treating agent is acetic anhydride.

JAMES WOTHERSPOON FISHER.
EDWARD WILLIAM WHEATLEY.
HAROLD BATES.

REFERENCES CITED

The following references are of record in the file of this patent:

UNITED STATES PATENTS

| Number | Name | Date |
| --- | --- | --- |
| 2,384,369 | D'Alelio | Sept. 4, 1945 |